(No Model.)
F. E. GROTHAUS.
LAWN MOWER.
No. 389,804. Patented Sept. 18, 1888.
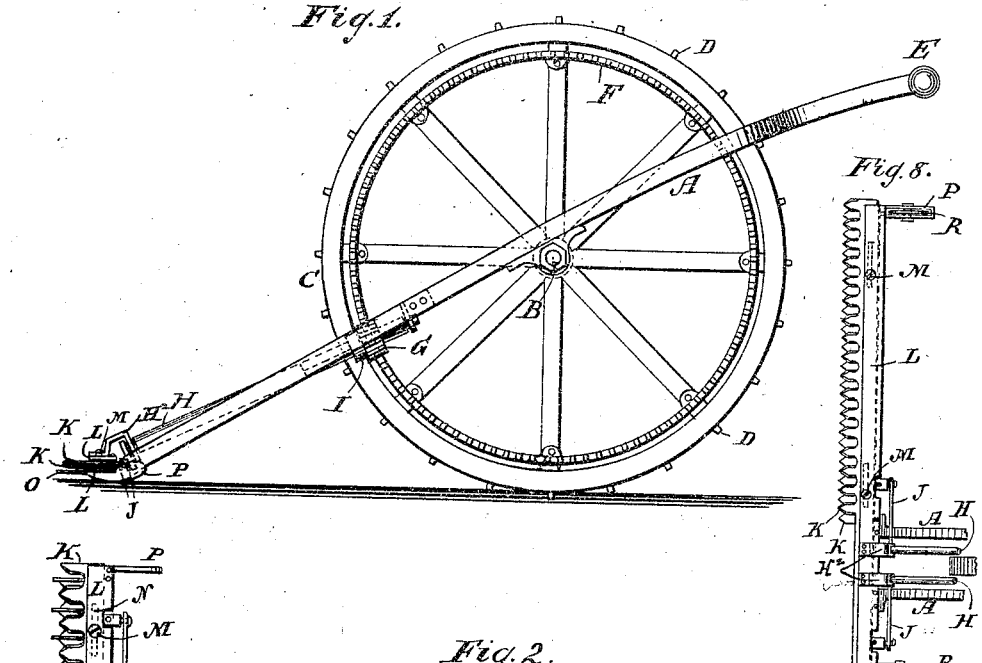
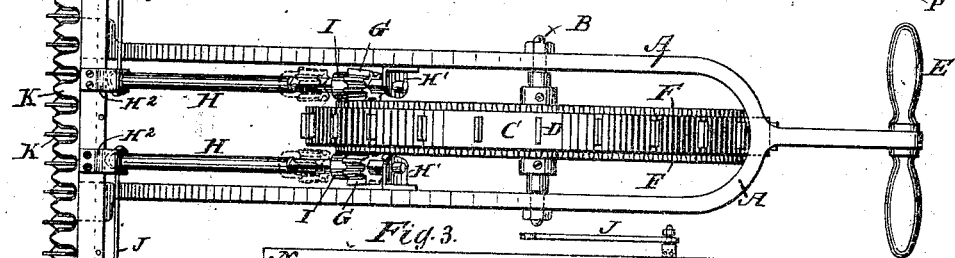
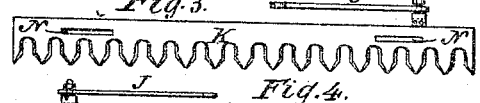
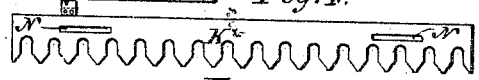
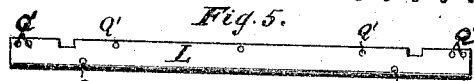
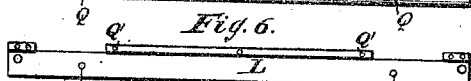
WITNESSES:
Edward Wolff
William Miller
INVENTOR
Frederick E. Grothaus.
BY
ATTORNEYS

UNITED STATES PATENT OFFICE.

FREDERICK E. GROTHAUS, OF SAN JUAN MILL, TEXAS.

LAWN-MOWER.

SPECIFICATION forming part of Letters Patent No. 389,804, dated September 18, 1888.

Application filed January 5, 1888. Serial No. 259,825. (No model.)

*To all whom it may concern:*

Be it known that I, FREDERICK E. GROTHAUS, a citizen of the United States, residing at San Juan Mill, in the county of Bexar and State of Texas, have invented new and useful Improvements in Mowers, of which the following is a specification.

This invention relates to improvements in mowers, and by means of this invention an easy working of the operating parts of the mower is secured. This invention is set forth in the following specification and claims, and illustrated in the accompanying drawings, in which—

Figure 1 is a side elevation of a mower. Fig. 2 is a plan view of a mower. Fig. 3 is a plan view of one of the cutters or knives. Fig. 4 is a plan view of the other cutter or knife. Fig. 5 is a plan view of one of the guide-plates. Fig. 6 is a plan view of the other guide-plate. Fig. 7 is a section in the plane $x$ $x$, Fig. 2, on a larger scale than Fig. 2. Fig. 8 is a plan view of a modification on a smaller scale than Fig. 2 and partly broken away.

Similar letters indicate corresponding parts.

In the drawings, the letter A indicates a bifurcated frame or support carrying the axle B of the wheel C, which is placed on its axle between the opposite sides of the frame. Projections D on the wheel secure revolution of the wheel when the mower is moved over the ground. The handle E serves for the application of power to move the device. To the wheel C are secured the gears F. As seen in Fig. 2, the gears F are secured to opposite sides of the wheel, so that the strain of said gears is distributed equally over the wheel C. Easy working of the parts is thus secured, and the wheel C, with its axle B, is not likely to be worn or injured in consequence of any unequal strain.

The gears F are adapted to rotate the pinions G, thereby rotating the shafts H, to which said pinions are attached. These shafts H H, two in number, are supported in an inclined position in opposite sides of the machine, their upper ends being journaled in bearings H', attached to the frame A, while their lower ends are journaled in straps or bearings H², attached to the guide-plates L, which are secured to the lower end of the bifurcated frame. The pinions G are feathered on the shafts H, so that said pinions can be slid along the shafts H to come into or out of gear with the gears F, as may be desired. When the pinions G are in gear with the gears F, the cutters will operate during the motion of the device, while when the pinions are not so in gear the cutters will not operate, as will presently appear. Suitable means—such as friction-collars I—serve to hold the pinions G in the proper position on the shafts H.

The lower ends of the shafts H connect by cranks or crank-pins with pitmen J, so that when the shafts H rotate a reciprocating motion is communicated to the pitmen J. The pitmen J are pivotally connected to the cutters K K and the reciprocating movements of the pitmen cause the cutters to reciprocate. The cutters are made to reciprocate or work together in opposite directions, so that an effective cutting or shearing operation results. The cutters K are made to reciprocate between guide-plates L. The guide-plates L are held to the frame A by screws M passing through holes Q in the plates L and through slots N in the cutters K. These guide-plates L are provided near their rear edges with holes Q' for the passage of screws M', by which they are held together. The slots N allow a reciprocating movement of the cutters. In order to steady the blades of grass or other material being cut, fingers O are applied to the lower guide-plate, L, as shown. The screws M, besides securing the plates L in place, can also be used to press the plates and the cutters more or less closely together, as may be desired.

The feet or shoes P are used to partly support the frame A, and said shoes allow the frame to glide easily over the ground. Wheels or casters can be applied in any suitable way in place of the shoes P; or, as seen in Fig. 8, the shoes P can be made to support wheels R, that are journaled therein.

The cutter K, as seen in Fig. 2, can be made to extend from each side of the frame A, or only from one side thereof, as seen in Fig. 8. The construction shown in Fig. 8 may be of advantage in certain localities or under certain conditions, since by having no cutter directly in front of the frame A the material being cut—such, for example, as long grass—will fall to one side of the frame A and not on the frame.

What I claim as new, and desire to secure by Letters Patent, is—

1. The combination of the bifurcated frame A, the single centrally-arranged drive-wheel C, journaled in the frame and having at each side an attached annular gear, F, the opposite bearings H', secured to the inner sides of the bifurcated frame, the guide-plates L, secured to the forward end of the frame, the bearing-plates H², secured on the guide-plates, the inclined shafts H, arranged between the sides of the bifurcated frame and journaled in said bearings, the pinions G, capable of being shifted on the shafts to mesh with the annular gears, the pitmen J, connected with the lower ends of the shafts, and the cutters K, connected with the pitmen, substantially as described.

2. The combination of a bifurcated frame, a driving-wheel, C, supported therein, gears F F, secured to opposite sides of said wheel, inclined pitmen-driving shafts H H, carrying at their inner ends pinions G G to engage said gears, guide-plates L L, supported by the lower and forward end of the frame, cutters K K, provided with slots N N, and supported between said guide-plates, pitmen J J, connecting the cutters and shafts, and adjusting-screws M, applied to said plates and cutters, substantially as described.

In testimony whereof I have hereunto set my hand and seal in the presence of two subscribing witnesses.

FREDERICK E. GROTHAUS. [L. S.]

Witnesses:
L. J. ASHLEY,
T. W. BESELER.